(12) United States Patent
Distelhoff et al.

(10) Patent No.: US 6,491,180 B2
(45) Date of Patent: *Dec. 10, 2002

(54) FUEL TANK

(75) Inventors: Markus Distelhoff, Frankfurt (DE); Karl Eck, Frankfurt (DE); Wilfried Fröhlich, Bad Camberg (DE); Dieter Keller, Aschaffenburg (DE); Justus Klöker, Neu Anspach (DE); Knut Meyer, Essen (DE); Ingo Mohr, Höhn (DE); Rainer Moser, Idstein (DE); Bernd Rumpf, Nidderau-Windecken (DE); Wolfgang Sinz, Sulzbach (DE)

(73) Assignee: Mannesmann VDO AG, Frankfurt/Maine (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/442,707

(22) Filed: Nov. 18, 1999

(65) Prior Publication Data

US 2002/0047015 A1 Apr. 25, 2002

(30) Foreign Application Priority Data

Nov. 18, 1998 (DE) .......................................... 198 53 097

(51) Int. Cl.$^7$ ............................................... B65D 90/02
(52) U.S. Cl. .................... 220/562; 220/4.14; 220/62.18
(58) Field of Search ...................... 220/560.14, 560.06, 220/560.05, 88.1, 900, 562, 563, 565, 4.14, 62.18, 62.19

(56) References Cited

U.S. PATENT DOCUMENTS

| | | | | | |
|---|---|---|---|---|---|
| 673,073 | A | * | 4/1901 | Bobrick | .................. 220/560.14 |
| 1,347,057 | A | * | 7/1920 | Ross | ............................ 169/46 |
| 1,393,719 | A | * | 10/1921 | DeSave | ........................ 220/564 |
| 2,095,460 | A | * | 10/1937 | Swords | .................... 220/88.1 X |
| 2,306,275 | A | * | 12/1942 | Murray | .................. 220/88.1 X |
| 2,404,418 | A | * | 7/1946 | Walker | ........................ 220/88.1 |
| 2,482,366 | A | * | 9/1949 | Potters | .................... 220/900 X |
| 3,149,942 | A | * | 9/1964 | Finch | ..................... 220/88.1 X |
| 3,372,679 | A | * | 3/1968 | Aitken | ........................ 123/519 |
| 3,397,720 | A | * | 8/1968 | Jones | ................. 220/560.14 X |
| 3,675,809 | A | * | 7/1972 | McGrew et al. | .... 220/560.14 X |
| 4,013,054 | A | * | 3/1977 | Basley et al. | ................ 123/519 |
| 4,524,609 | A | * | 6/1985 | Sharp | .......................... 220/746 |
| 4,852,761 | A | * | 8/1989 | Turner et al. | ................ 123/519 |
| 4,919,103 | A | * | 4/1990 | Ishugro et al. | .............. 123/514 |
| 4,971,214 | A | * | 11/1990 | Lillywhite et al. | ........... 220/565 |

(List continued on next page.)

FOREIGN PATENT DOCUMENTS

| | | |
|---|---|---|
| DE | 3600177 | 7/1986 |
| DE | 3910841 | 11/1990 |
| DE | 4142016 | 6/1993 |
| DE | 19515255 | * 10/2000 |
| DE | 10019784 | * 10/2001 |
| FR | 627345 | * 10/1927 .................. 220/900 |

OTHER PUBLICATIONS

European Patent Office Search Report, Jun. 6, 2001, 3 pages.

*Primary Examiner*—Lee Young
*Assistant Examiner*—Joseph C. Merek
(74) *Attorney, Agent, or Firm*—Mayer, Brown, Rowe & Maw

(57) ABSTRACT

A fuel tank for a motor vehicle comprising a wall composed of two shells arranged one above the other. The outer shell of the wall preferably has an inlet orifice and an outlet orifice. A filter element is arranged in front of the outlet orifice. Scavenging air from the inlet orifice thereby passes first into a gap between the shells and subsequently to a filter element. As a result, fuel vapors can no longer diffuse through the wall and pollute the environment.

17 Claims, 1 Drawing Sheet

U.S. PATENT DOCUMENTS 5,056,493 A * 10/1991 Holzer .................. 123/518
5,167,352 A * 12/1992 Robbins ................ 220/62.2
5,398,839 A * 3/1995 Kleyn .................. 220/4.14 X
5,547,096 A    8/1996 Kleyn
5,570,805 A * 11/1996 Harding ................ 220/565
5,702,026 A * 12/1997 Lindquist .............. 220/745
5,901,689 A * 5/1999 Kimura et al. ......... 123/518
6,182,693 B1 * 2/2001 Stack et al. .......... 137/565.17

* cited by examiner

FUEL TANK

FIELD OF THE INVENTION

The present invention relates generally to a fuel tank for a motor vehicle with a wall manufactured from plastic, in particular by the injection molding method.

BACKGROUND OF THE INVENTION

Plastic fuel tanks are often used in present-day motor vehicles and are therefore known. In such cases, the fuel tank is usually composed of a plurality of parts manufactured by the injection molding method. Manufacturing the fuel tank by the injection molding method makes it possible to easily produce complicated shapes or insert build-in components. The fuel tank thereby becomes highly cost-effective.

The disadvantage of fuel tanks made of plastic is that fuel vapors may diffuse through the tank wall. This leads to unnecessary pollution of the environment by fuel vapors.

Thus, there is a need for a fuel tank of the type initially mentioned, that can be produced particularly cost-effectively and that as few fuel vapors as possible pass through its wall into the environment.

Other needs will become apparent upon a reading of the following description taken in conjunction with the drawings.

SUMMARY OF THE INVENTION

In one form of the invention, the aforementioned needs are fulfilled by a fuel tank, whereby the fuel tank wall contains at least two shells arranged one above the other, and the fuel tank has means for the removal of fuel vapors present in a gap between the shells.

By virtue of this design, the fuel tank has a double wall which prevents direct diffusion of the fuel vapors. The fuel vapors which have passed through the inner shell collect initially in the gap between the walls. Further diffusion through the second wall is prevented by the means for the removal of the fuel vapors. As a result, virtually no fuel vapors pass into the environment.

According to an advantageous development of the invention, the means for the removal of the fuel vapors are designed to be particularly cost-effective if they have a filter element arranged between the two shells for absorbing fuel vapors. Another advantage of this design is that noises emanating from the fuel tank are damped by the filter element.

According to another advantageous development of the invention, the means for the removal of the fuel vapors permanently prevent fuel vapors from escaping if they have, arranged on the outer shell, an inlet orifice and an outlet orifice for scavenging air. In this case, the scavenging air may be provided, according to choice, either alone or together with the filter element arranged between the shells, for the removal of the fuel vapors.

According to another advantageous development of the invention, any inadvertent escape of scavenging air laden with fuel vapors from the gap between the shells can be avoided if the inlet orifice and the outlet orifice are capable of being closed in each case by a valve.

According to another advantageous development of the invention, the fuel vapors can be eliminated by means of the scavenging air if a connection for a line leading to an internal combustion engine of the motor vehicle is arranged in the region of the outlet orifice. The scavenging air is thereby delivered to the internal combustion engine. The fuel vapors are subsequently combusted.

The filter element arranged between the shells could be exchanged, for example, after an intended timespan. However, this necessitates highly cost-intensive maintenance of the fuel tank. According to another advantageous development of the invention, regular exchange of the filter element can be avoided if the filter element is spaced from the shells. A gap, through which scavenging air can flow, is thereby located between the filter element and the shells. As a result, the filter element is cleaned by the scavenging air. By virtue of this design, there is no need for scavenging air to flow constantly through the gap between the shells. Throughflow can take place, for example, at intended time intervals.

The fuel tank according to the invention can be manufactured particularly cost-effectively if the means for the removal of the fuel vapors have a filter element arranged at the outlet orifice. Another advantage of this design is that the filter can be separated in a simple way from the remaining regions of the fuel tank. This results in the fuel tank according to the invention being recyclable in a particularly simple way. The fuel vapors are removed particularly reliably if the filter element contains activated charcoal.

A contribution to further reducing the manufacturing costs of the fuel tank according to the invention is made if spacers for separating the shells are manufactured in one piece with one of the shells. The spacers can be manufactured in one piece with one of the shells in a very simple way by the injection molding method. The shells can subsequently be assembled very simply.

According to another advantageous development of the invention, the shells can be manufactured in cost-effective, simply designed injection molds if the spacers are designed as a lattice-like insert part.

A contribution to a further reduction in the manufacturing costs of the fuel tank according to the invention is made if the filter element arranged between the shells forms a structural unit with the spacers.

The invention permits numerous embodiments. In order to make its principle even clearer, two of these are illustrated in the drawings and are described below.

DETAILED DESCRIPTION

Figure 1:
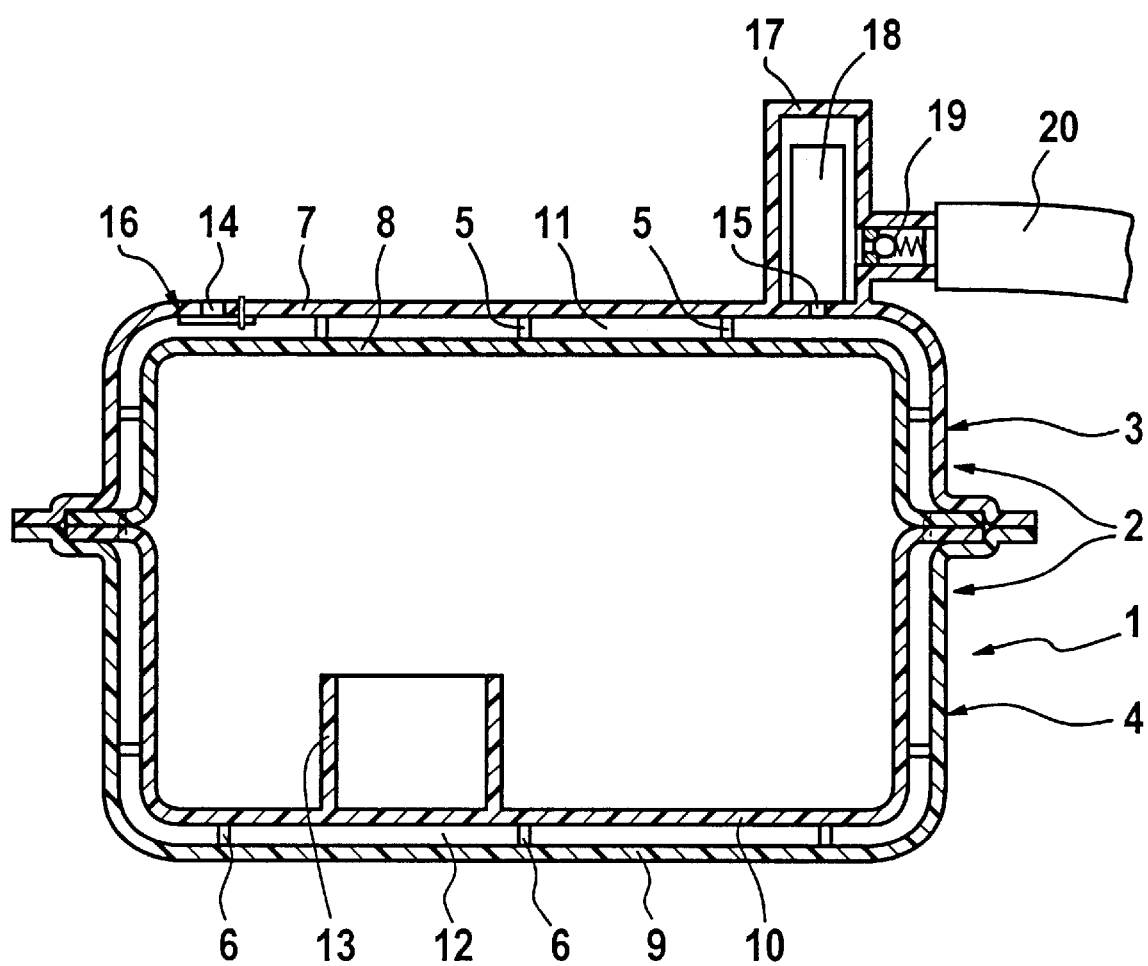
FIG. 1 shows a diagrammatic illustration of a fuel tank according to the present invention in longitudinal section.

While the present invention is capable of embodiment in various forms, there is shown in the drawings and will be hereinafter described a presently preferred embodiment with the understanding that the present disclosure is to be considered as an exemplification of the invention, and is not intended to limit the invention to the specific embodiment illustrated and described herein.

FIG. 1 shows a fuel tank 1 according to the present invention for a motor vehicle, with a wall 2 manufactured from plastic by the injection molding method. The fuel tank 1 comprises an upper part 3 and a lower part 4. The parts 3, 4 have in each case two shells 7–10 arranged one above the other and spaced from one another by spacers 5, 6. A gap 11, 12 is thereby located in each case between the shells 7–10 of the two parts 3, 4. The lower part 4 is preferably manufactured in one piece with a baffle 13. The outer shell 7 of the upper part 3 has an inlet orifice 14 and an outlet orifice 15 for scavenging air. The inlet orifice 14 is capable of being closed by a valve 16 by means of a diaphragm. A housing 17 with a filter element 18 and with a nonreturn valve 19 is arranged in front of the outer orifice 15. Connected to the housing 17 is a line 20 leading to an internal combustion engine, not illustrated, of a motor vehicle. Thus, scavenging air flowing through the inlet orifice 14 into the gap 11 between the shells 7, 8 passes through the filter element 18 to the internal combustion engine. Consequently, fuel vapors cannot diffuse through the wall 2 and pass into the environment.

The gap 12 between the shells 9, 10 of the lower part 4 could, for example, be connected to the gap 11 between the shells 7, 8 of the upper part 3 or have its own connection, not illustrated, to the internal combustion engine. The spacers 5, 6 are manufactured, according to choice, as insertion parts or in one piece with one of the shells 7–10. The filter element 18 may be designed, for example, as an activated charcoal filter.

Figure 2:
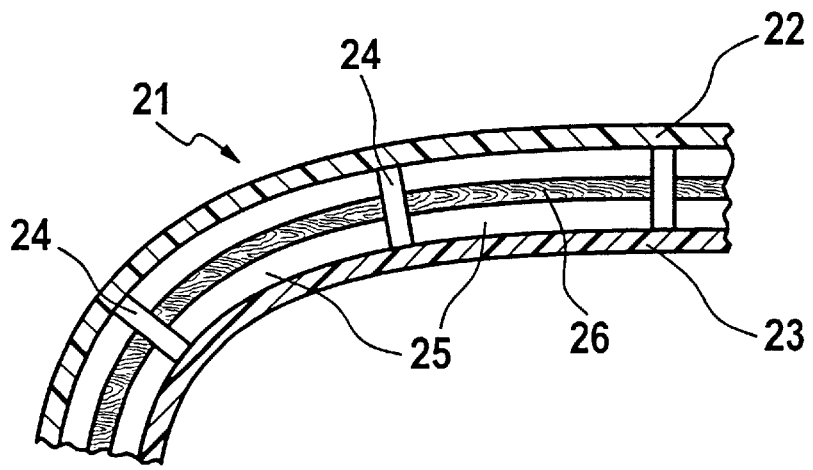
FIG. 2 shows a part region of one wall of a further embodiment of the fuel tank according to the present invention.

FIG. 2 shows a part region of one wall 21 of a further embodiment of the fuel tank according to the invention. The wall 21 has an outer shell 22 and an inner shell 23, between which a gap 25 set by spacers 24 is located. The spacers 24 pass through a mat-like filter element 26. The filter element 26 and the spacers 24 are designed, in this case, as an insertion part. The filter element 26 is spaced from the two shells 22, 23, so that scavenging air can sweep along the filter element 26 for cleaning purposes.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A fuel tank for a motor vehicle, comprising a wall manufactured from plastic, wherein the wall has at least two shells arranged one above the other, each shell having a top surface, a bottom surface and a peripheral wall connecting the top and bottom surfaces, wherein the fuel tank has means for the removal of fuel vapors present in a gap formed between the top surfaces, bottom surfaces and peripheral walls of the shells, wherein a filter element is arranged in the gap, and wherein the filter element does not contact the shells.

2. The fuel tank as claimed in claim 1, wherein the means for the removal of the fuel vapors have, arranged on the outer shell, an inlet orifice and an outlet orifice for scavenging air.

3. The fuel tank as claimed in claim 2, wherein the inlet orifice and the outlet orifice are capable of being closed by a valve.

4. The fuel tank as claimed in claim 2, wherein a connection for a line leading to an internal combustion engine of the motor vehicle is arranged in the region of the outlet orifice.

5. The fuel tank as claimed in claim 2, wherein the means for the removal of the fuel vapors have a filter element arranged at the outlet orifice.

6. The fuel tank as claimed in claim 1, wherein the filter element comprises activated charcoal.

7. The fuel tank as claimed in claim 1 wherein the filter is spaced from the shells with spacers and wherein said spacers are manufactured in one piece with one of the shells.

8. The fuel tank as claimed in claim 1, wherein there are spacers between the shells and wherein the spacers are designed as a lattice insert part.

9. The fuel tank as claimed in claim 8, wherein the filter element arranged between the shells forms a structural unit with the spacers.

10. A fuel tank comprising:

a first shell having a top surface, a bottom surface and a peripheral wall connecting the top and bottom surfaces;

a second shell having a top surface, a bottom surface and a peripheral wall connecting the top and bottom surfaces, the second shell surrounding the first shell, wherein there is a gap between the top surfaces, bottom surfaces and peripheral side walls of the first and second shells;

an outlet orifice attached to the second shell, wherein the outlet orifice communicates with the gap;

a filter element in the gap, wherein there is a first gap segment between the first shell and the filter element and a second gap segment between the second shell and the filter element and wherein the filter element does not come into contact with the shells.

11. The fuel tank as claimed in claim 10, wherein the first and second shells comprise injection molded plastic.

12. The fuel tank as claimed in claim 10, wherein the fuel tank further comprises an inlet orifice attached to the second shell.

13. The fuel tank as claimed in claim 12, wherein the outlet orifice and inlet orifice contain valves.

14. The fuel tank as claimed in claim 10, wherein the outlet orifice is connected to a internal combustion engine.

15. The fuel tank as claimed in claim 10, wherein a filter is connected to the outlet orifice.

16. The fuel tank as claimed in claim 15, wherein the filter comprises activated charcoal.

17. The fuel tank as claimed in claim 10, wherein there are a plurality of spacers located between the first and second shells.

* * * * *